United States Patent
Charrat et al.

(10) Patent No.: US 10,169,754 B2
(45) Date of Patent: Jan. 1, 2019

(54) METHOD AND SYSTEM FOR NFC TRANSACTION

(75) Inventors: Bruno Charrat, Aix-en-Provence (FR); Gary Chew, Aix-en-Provence (FR)

(73) Assignee: INSIDE SECURE, Aix-en-Provence (FR)

( * ) Notice: Subject to any disclaimer, the term of this patent is extended or adjusted under 35 U.S.C. 154(b) by 497 days.

(21) Appl. No.: 13/977,107

(22) PCT Filed: Nov. 17, 2011

(86) PCT No.: PCT/FR2011/052686
§ 371 (c)(1),
(2), (4) Date: Jun. 28, 2013

(87) PCT Pub. No.: WO2012/066251
PCT Pub. Date: May 24, 2012

(65) Prior Publication Data
US 2013/0282570 A1    Oct. 24, 2013

(30) Foreign Application Priority Data

Nov. 17, 2010  (FR) .................................... 10 04473
Nov. 17, 2010  (FR) .................................... 10 04475

(51) Int. Cl.
*G06Q 20/32*    (2012.01)
*G06Q 20/20*    (2012.01)
(Continued)

(52) U.S. Cl.
CPC ......... *G06Q 20/325* (2013.01); *G06Q 20/204* (2013.01); *G06Q 20/32* (2013.01);
(Continued)

(58) Field of Classification Search
CPC ........ G06Q 40/04; G06Q 40/00; G06Q 40/06; G06Q 20/10; H05K 999/00; G06C 40/04; G06C 40/00; G06C 40/06
(Continued)

(56) References Cited

U.S. PATENT DOCUMENTS 5,479,654 A   12/1995  Squibb
5,765,173 A    6/1998  Cane et al.
(Continued)

FOREIGN PATENT DOCUMENTS

EP    2009605 A1    12/2008
EP    2160002 A1     3/2010
(Continued)

OTHER PUBLICATIONS

Moreland, David; Nepal, Surya; Hwang, Hon; Zic, John. A snapshot of trusted personal devices applicable to transaction processing. Personal and Ubiquitous Computing; London vol. 14, Iss. 4, May 2010.*
(Continued)

*Primary Examiner* — Florian M Zeender
*Assistant Examiner* — Fawaad Haider
(74) *Attorney, Agent, or Firm* — Brake Hughes Bellermann LLP

(57) ABSTRACT

A method for performing a transaction between a portable device and a transaction terminal includes establishing a communication channel between the portable device and the transaction terminal; establishing a first data link between the transaction terminal and the transaction server; and using an application program in the transaction server to perform the transaction with the transaction terminal through the data link, on behalf of the portable device.

16 Claims, 9 Drawing Sheets

(51) Int. Cl.

| | | |
|---|---|---|
| *G06Q 20/34* | (2012.01) | |
| *G06Q 30/06* | (2012.01) | |
| *G07F 7/10* | (2006.01) | |
| *H04W 12/02* | (2009.01) | |
| *H04W 4/80* | (2018.01) | |
| *H04L 29/06* | (2006.01) | |
| *H04W 4/00* | (2018.01) | |

(52) U.S. Cl.
CPC ....... *G06Q 20/322* (2013.01); *G06Q 20/3278* (2013.01); *G06Q 20/351* (2013.01); *G06Q 20/352* (2013.01); *G06Q 20/3552* (2013.01); *G06Q 20/3574* (2013.01); *G06Q 30/0601* (2013.01); *G07F 7/1008* (2013.01); *H04W 12/02* (2013.01); *H04L 63/0272* (2013.01); *H04W 4/008* (2013.01); *H04W 4/80* (2018.02)

(58) Field of Classification Search
USPC .......................................................... 705/37
See application file for complete search history.

(56) References Cited

U.S. PATENT DOCUMENTS

| | | | |
|---|---|---|---|
| 5,794,254 A | 8/1998 | McClain | |
| 5,990,810 A | 11/1999 | Williams | |
| 6,014,676 A | 1/2000 | McClain | |
| 6,038,665 A | 3/2000 | Bolt et al. | |
| 6,049,874 A | 4/2000 | McClain et al. | |
| 6,101,507 A | 8/2000 | Cane et al. | |
| 7,469,151 B2 | 12/2008 | Khan et al. | |
| 8,083,140 B1 | 12/2011 | Katzer et al. | |
| 2004/0236803 A1 | 11/2004 | Spiegeleer | |
| 2005/0268068 A1 | 12/2005 | Ignatius et al. | |
| 2006/0118622 A1 | 6/2006 | Zatloukal et al. | |
| 2007/0100913 A1 | 5/2007 | Sumner et al. | |
| 2007/0192863 A1 | 8/2007 | Kapoor et al. | |
| 2007/0198432 A1* | 8/2007 | Pitroda ................ | G06Q 20/02 705/64 |
| 2008/0048022 A1* | 2/2008 | Vawter ................ | G06Q 20/32 235/380 |
| 2008/0051059 A1 | 2/2008 | Fisher | |
| 2008/0155257 A1 | 6/2008 | Werner et al. | |
| 2009/0094125 A1 | 4/2009 | Killian et al. | |
| 2009/0292619 A1* | 11/2009 | Kagan ................ | G06Q 20/102 705/26.1 |
| 2010/0044444 A1 | 2/2010 | Jain et al. | |
| 2010/0058463 A1 | 3/2010 | Bertin | |
| 2010/0063906 A1* | 3/2010 | Nelsen ................ | G06Q 20/28 705/30 |
| 2010/0082444 A1 | 4/2010 | Lin et al. | |
| 2010/0088188 A1* | 4/2010 | Kumar ................ | G06Q 20/10 705/17 |
| 2001/0153721 | 6/2010 | Mellqvist | |

FOREIGN PATENT DOCUMENTS

| | | |
|---|---|---|
| GB | 2457221 A | 8/2009 |
| WO | 2009039419 A1 | 3/2009 |
| WO | 2009091117 A2 | 7/2009 |

OTHER PUBLICATIONS

Office Action dated Dec. 6, 2013 in U.S. Appl. No. 13/297,378.
Office Action dated Jan. 17, 2014 in U.S. Appl. No. 13/297,323.
Office Action dated Apr. 14, 2014 in U.S. Appl. No. 13/297,378 by Charrat.
Office Action dated Jan. 30, 2015 in U.S. Appl. No. 13/297,378.
Search Report and Written Opinion dated Jun. 21, 2011 in FR Application No. 1004475.
Venkataramani et al., "Mobile phone based RFID architecture for secure electronic Payments using RFID credit cards," The Second International Conference on Availability, Reliability and Security, pp. 610-620 (2007).
Lu, "Network smart card review and analysis," Computer Networks, vol. 51, No. 9, pp. 2234-2248 (2007).
Madlmayr et al, "Managing an NFC Ecosystem," 7th International Conference on Mobile Business, pp. 95-101 (2008).
Nordlund, "Secure Over-The-Air Services in NFC Ecosystems," retrieved from http://www.nfc-research.at/fileadmin/congress/pdf/05_Venyon_Sirpa_Nordlund.pdf on Feb. 25, 2008.
Search Report and Written Opinion dated Jun. 14, 2011 in FR Application No. 1004473.
Madlmayr, "A mobile trusted computing architecture for a near field communication ecosystem," Proceedings of the 10th International Conference on Information Integration and Web-based Applications & Services, pp. 563-566 (2008).
Office Action dated Mar. 30, 2012 in U.S Appl. No. 13/297,378.
Office Action dated Oct. 25, 2012 in U.S Appl. No. 13/297,378.
Int'l Search Report and Written Opinion dated Mar. 2, 2012 in Int'l Application No. PCT/FR2011/052686.
Int'l Preliminary Report on Patentability dated May 21, 2013 in Int'l Application No. PCT/FR2011/052686.
Office Action dated Aug. 21, 2013 in U.S Appl. No. 13/297,323.

* cited by examiner

METHOD AND SYSTEM FOR NFC TRANSACTION

CROSS-REFERENCE TO RELATED APPLICATIONS

This application is a Section 371 of International Application No. PCT/FR2011/052686, filed Nov. 17, 2011, which was published in the French language on May 24, 2012, under International Publication No. WO 2012/066251 A1 and the disclosure of which is incorporated herein by reference.

BACKGROUND OF THE INVENTION

Embodiments of the present invention relate to a near field communication transaction method and system.

In recent years, the appearance of inductive coupling contactless communication techniques, also referred to as NFC techniques (Near Field Communication), have changed the world of smart cards, making it possible firstly to produce contactless payment cards and then to integrate a secure processor and an NFC controller into portable electronic objects such as mobile telephones, to perform NFC transactions.

FIG. 1 schematically represents a classic transaction system including a contactless smart card CC1 and a transaction terminal TT. The terminal TT is for example a cash withdrawal point, a sales outlet (ticket machine, food and drink dispenser, or the like), an automatic access control pay terminal (metro access terminal, bus payment terminal, or the like).

The contactless card CC1 includes a Contactless Integrated Circuit CIC equipped with a secure processor and an antenna coil AC1 connected to the integrated circuit. The terminal TT itself includes an antenna coil AC2 and is configured to perform an NFC transaction with the card CC1 by emitting a magnetic field FLD. The transaction includes the exchange of Application Protocol Data Units APDU. The application protocol data includes commands CAPDU sent by the terminal and responses RAPDU sent by the card. The terminal TT may be linked in real time or non-real time to a transaction server SV0, to validate a payment and/or debit an account held by the user.

FIG. 2 schematically represents a transaction system including a mobile telephone HD1 and the transaction terminal TT. The telephone HD1 includes a main processor PROC1, a radiocommunication circuit RCCT, a SIM (Subscriber Identity Module) card secure processor PROC2, an NFC controller referred to as "NFCC", an antenna coil AC3 linked to the controller NFCC and a secure processor PROC3 configured to perform NFC transactions.

The processor PROC3 includes a central processing unit CPU, an operating system OS, a Card Application Program CAP and/or a Reader Application Program RAP. The processor PROC3 is linked to the controller NFCC through a bus BS1, for example a Single Wire Protocol bus SWP. In practice, the processor PROC3 may be a Universal Integrated Circuit Card UICC, for example of mini-SIM or micro-SIM type.

An example of functional architecture of the controller NFCC and of the processor PROC3 is represented in FIG. 3. The controller NFCC includes a host controller HC and a Contactless Front End Interface CLF which is linked to the antenna coil AC3. In practice, the host controller HC and the interface CLF may be integrated into the same semiconductor chip, such as the MicroRead® chip marketed by the applicant.

The bus BS1 linking the processor PROC3 and the controller NFCC is used as a physical medium for a communication interface called a Host Controller Interface (HCI) through which the controller NFCC and the processor PROC3 exchange data in accordance with a Host Controller Protocol HCP. The interface HCI and the protocol HCP are described in the specifications ETSI TS 102 622 of the European Telecommunications Standards Institute, entitled "Smart cards; Universal Integrated Circuit Card (UICC); Contactless Front-end (CLF) interface; Host Controller Interface (HCI)". The protocol HCP provides for routing of data according to routing channels called "pipes", through which application protocol data APDU is exchanged during a transaction between the processor PROC3 and the transaction terminal TT.

The interface CLF may generally operate according to several RF technologies referred to as "RFTi" in FIG. 3, for example "Type A" or "Type B" as defined by ISO/IEC 14443 parts 2, 3 and 4, "Type B'" as defined by ISO/IEC 14443-2, with a standard framing as defined by ISO/IEC 14443-3, and "Type F" as defined by ISO 18092 (as passive mode at 212 and 424 kilobytes per second) or by the Japanese industrial standard JIS X 6319-4.

During the execution of the card application CAP, the processor PROC3 emulates a contactless card and uses the controller NFCC in passive mode to perform a transaction with a transaction terminal TT which emits the magnetic field FLD. A pipe P1 is first opened between the card application CAP and the interface CLF of the controller NFCC, which is configured for the occasion in an RFTi technology. The terminal TT sends the controller NFCC commands CAPDU that the controller forwards to the processor PROC3 through the pipe P1. The processor PROC3 issues responses RAPDU which are sent to the controller NFCC through the pipe P1, and then sent to the terminal TT by the controller NFCC, through an RF channel.

During the execution of the reader application RAP, the processor PROC3 performs a transaction with a contactless integrated circuit CIC arranged in a contactless card CC1 or another medium. The controller NFCC is in an active operating mode where it emits a magnetic field FLD. A pipe P1 is first opened between the reader application RAP and the interface CLF of the controller NFCC, which is configured for the occasion in an RFTi technology. The reader application RAP then issues commands CAPDU which are sent to the controller NFCC through the pipe P2, and then sent to the integrated circuit CIC through an RF channel. The contactless integrated circuit CIC sends back to the controller NFCC responses RAPDU that the controller forwards to the processor PROC3 through the pipe P2.

It is well known that the development of NFC technology is closely related to the development of card applications in portable devices such as mobile telephones, so as to use such portable devices as contactless smart cards. Although infrastructures equipped with NFC transaction terminals already exist, in particular in the field of payment, the integration of secure processors into mobile telephones to execute such applications is not carried out at a sufficient pace to enable NFC technology to develop as expected.

One restriction which hinders development is the complexity and cost of a secure processor such as the processor PROC3 represented in FIGS. 2 and 3. The latter must preferably be capable of executing various card applications and must therefore contain as many bank keys (encryption keys) as card applications supplied by different banks. It must in addition have sufficient computing power to carry out complex encryption calculations during the authentication phase of a transaction. Moreover, the personalization of the processor, i.e. loading a card application CAP into the memory thereof, is a complex operation that must be highly secured and requiring external parties such as a Trusted Service Manager TSM. Lastly, in the event that the telephone is stolen or during a maintenance operation on the telephone, the processor PROC3 is liable to be attacked by a fraudster to discover the bank keys it includes.

It may therefore be desirable to provide a method enabling an NFC transaction to be performed by way of a mobile telephone-type portable device with an architecture that is simpler and less expensive to implement than known architectures.

BRIEF SUMMARY OF THE INVENTION

Some embodiments of the present invention relate to a method for performing a transaction between a portable device and a transaction terminal, including providing at least one transaction server linked to the transaction terminal by IT resources and including at least one application program configured to perform a transaction with the transaction terminal on behalf of the portable device, establishing a near field communication channel between the portable device and the transaction terminal, and providing the transaction terminal, by way of the portable device, with application and transaction information, establishing a first data link between the transaction terminal and the server, without going through the portable device, by using the application and transaction information, and using the application program in the server to perform the transaction with the transaction terminal through the first data link, on behalf of the portable device, the transaction including the transaction terminal sending the application program of the server first application protocol data, and the application program of the server sending the transaction terminal on behalf of the portable device, second application protocol data.

According to one embodiment, the application and transaction information includes credentials of the portable device.

According to one embodiment, the method includes activating the application program in the server and linking it to the transaction terminal through the first data link so that it performs the transaction on behalf of the portable device.

According to one embodiment, a piece of information relating to the application program to be activated is included in the application and transaction information provided to the server through the first data link.

According to one embodiment, the method includes establishing a second data link between the portable device and the server, without going through the transaction terminal, and providing the server, through the second data link, with a piece of information relating to the application program to be activated.

According to one embodiment, the method includes providing the server with a piece of information relating to a time during which the application program can be activated.

According to one embodiment, the method includes providing the server with identification data of a user, and configuring the server so that it refuses to execute the transaction on behalf of the portable device if the identification data is incorrect.

Some embodiments also relate to a transaction system including a portable device, a transaction terminal, and at least one transaction server linked to the transaction terminal by IT resources, the portable device and the transaction terminal including near field communication circuitry, wherein the server includes at least one application program configured to perform a transaction with the transaction terminal on behalf of the portable device, the portable device is configured to establish a near field communication channel with the transaction terminal, and provide the transaction terminal with application and transaction information, the transaction terminal is configured to establish a first data link between the transaction terminal and the transaction server, without going through the portable device, and the transaction server is configured to use the application program to perform the transaction with the transaction terminal through the first data link, on behalf of the portable device, the transaction including the transaction terminal sending the application program of the server first application protocol data, and the application program of the server sending the transaction terminal on behalf of the portable device, second application protocol data.

According to one embodiment, the application and transaction information includes credentials of the portable device.

According to one embodiment, the transaction server is configured to activate the application program and link it to the transaction terminal through the first data link so that it performs the transaction on behalf of the portable device.

According to one embodiment, the portable device is configured to include in the application and transaction information a piece of information relating to the application program to be activated.

According to one embodiment, the portable device is configured to establish a second data link with the transaction server, without going through the transaction terminal, and provide the server, through the second data link, with a piece of information relating to the application program to be activated.

According to one embodiment, the portable device is configured to provide the server with a piece of information relating to a time during which the application program can be activated.

According to one embodiment, the portable device is configured to provide the server with identification data of a user, and the server is configured to refuse to execute the transaction on behalf of the portable device if the identification data is incorrect.

According to one embodiment, the transaction terminal receives the application and transaction information by reading it in a register or a memory of the portable device.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Some embodiments of a transaction system and method according to the present invention will be described in relation with, but not limited to, the following Figs., in which:

In the drawings:

Figure 1:
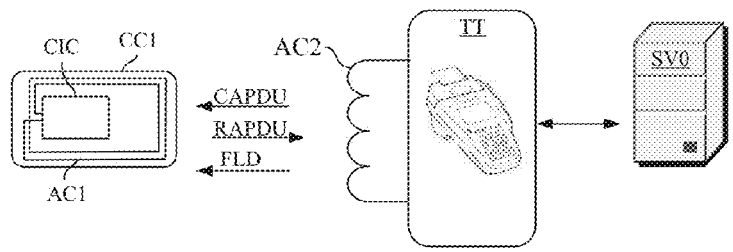
Figure 2:
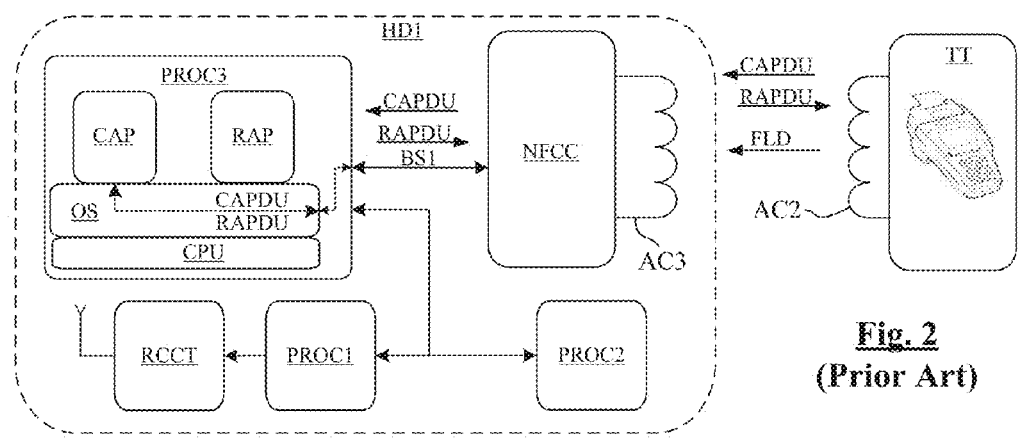
Figure 3:
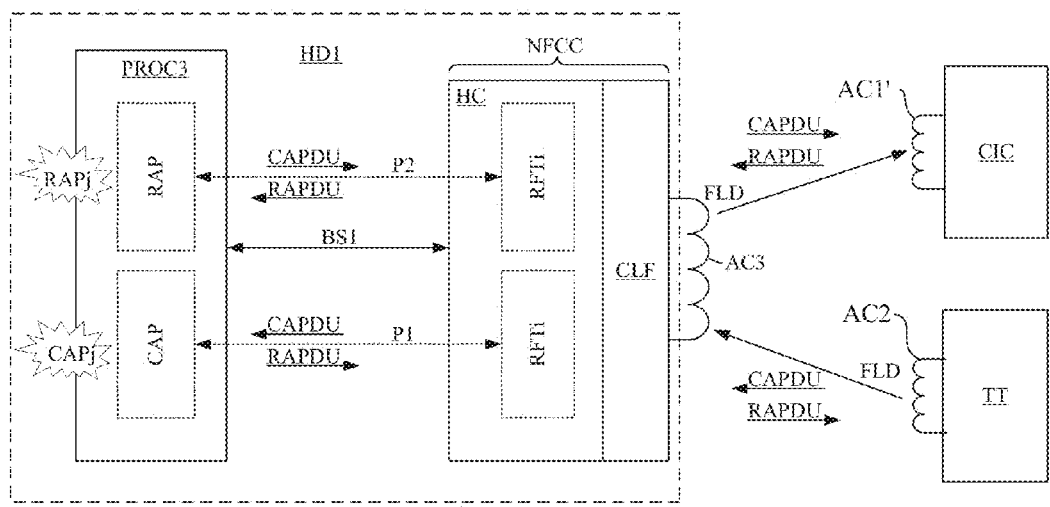
Figure 4:
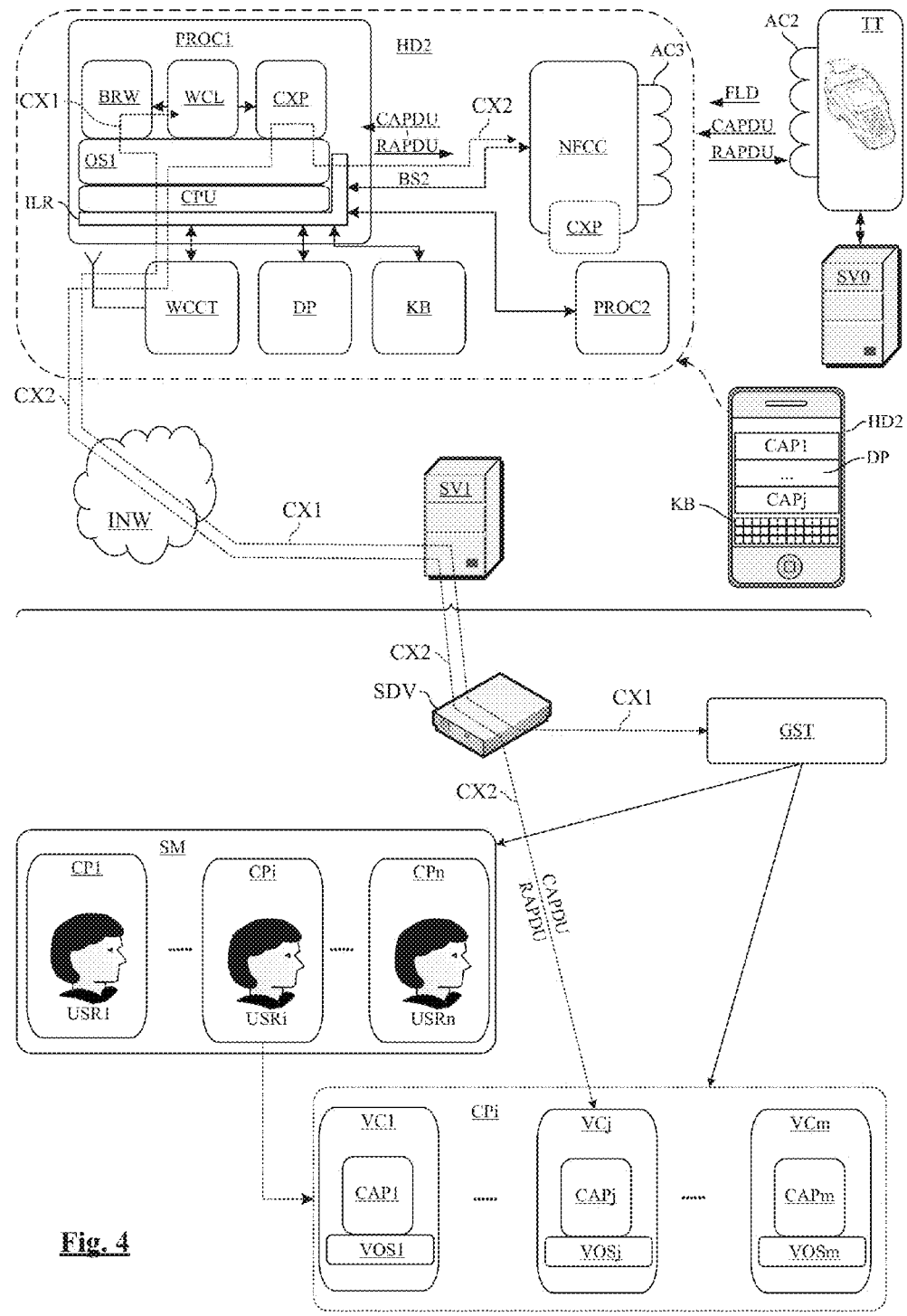
Figure 5:
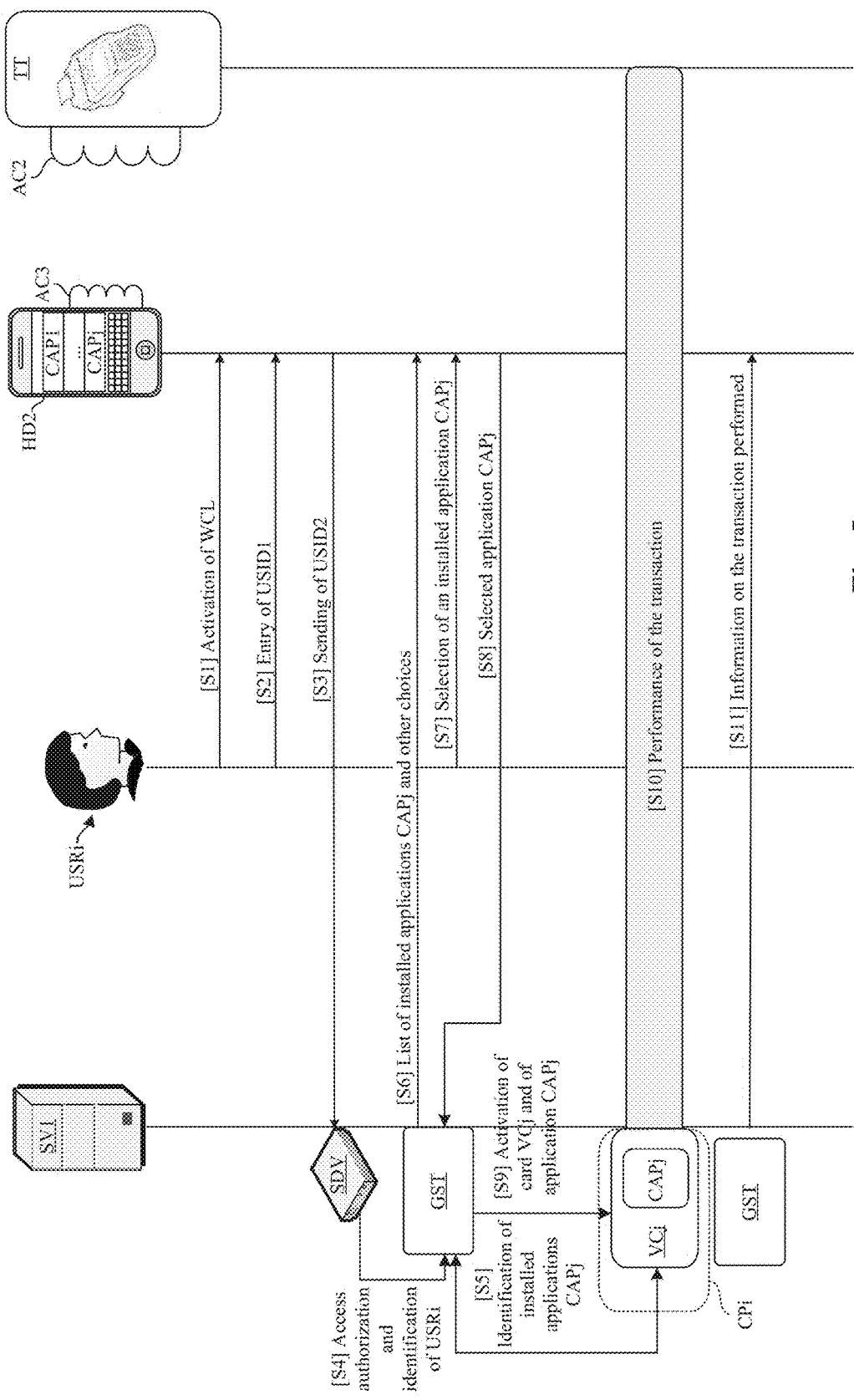
Figure 6:
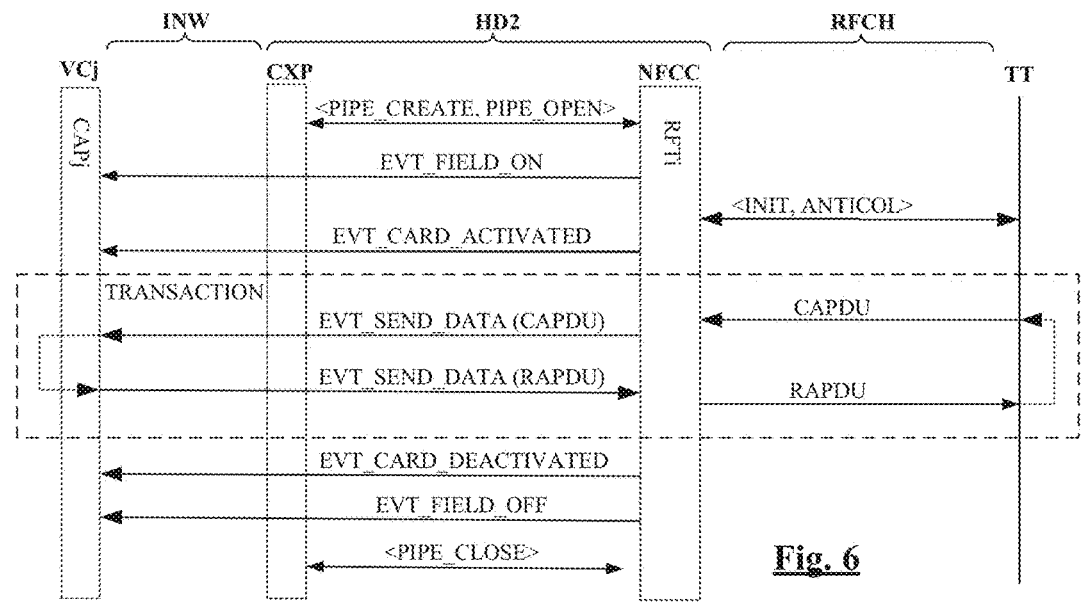
Figure 7:
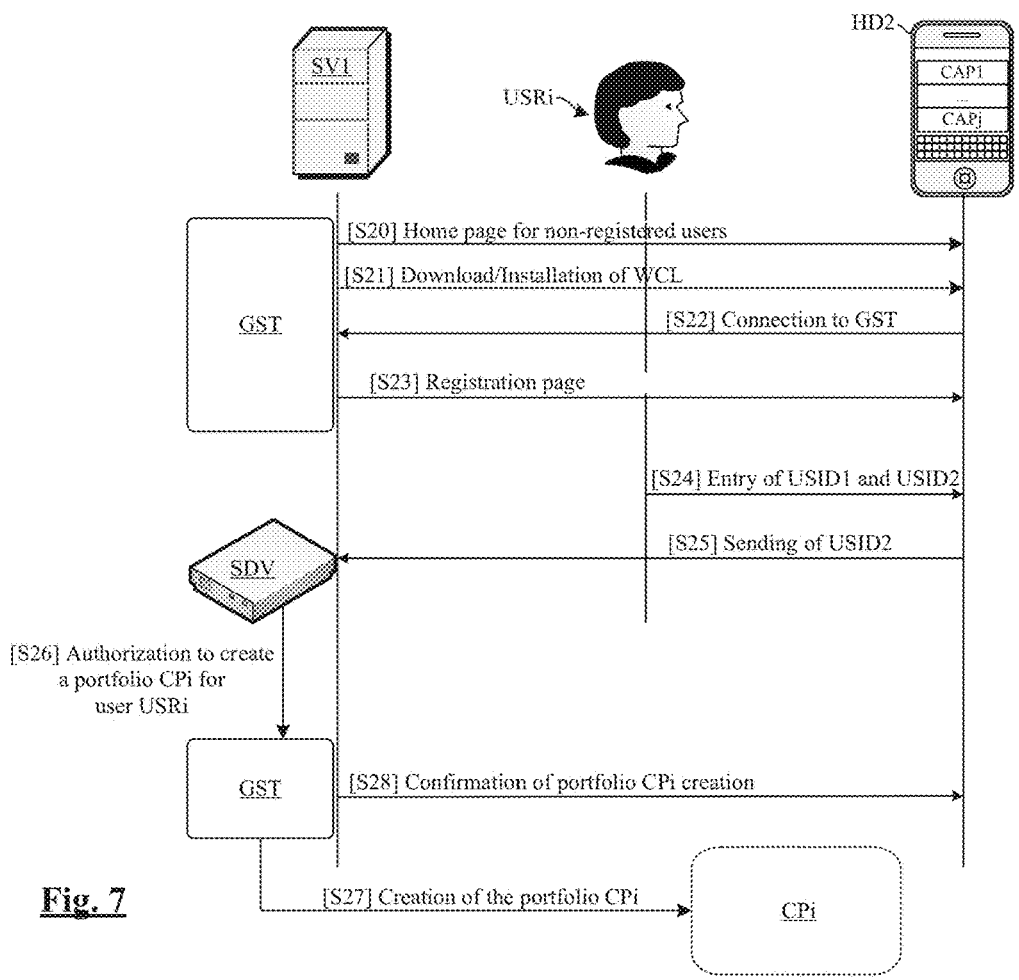
Figure 8:
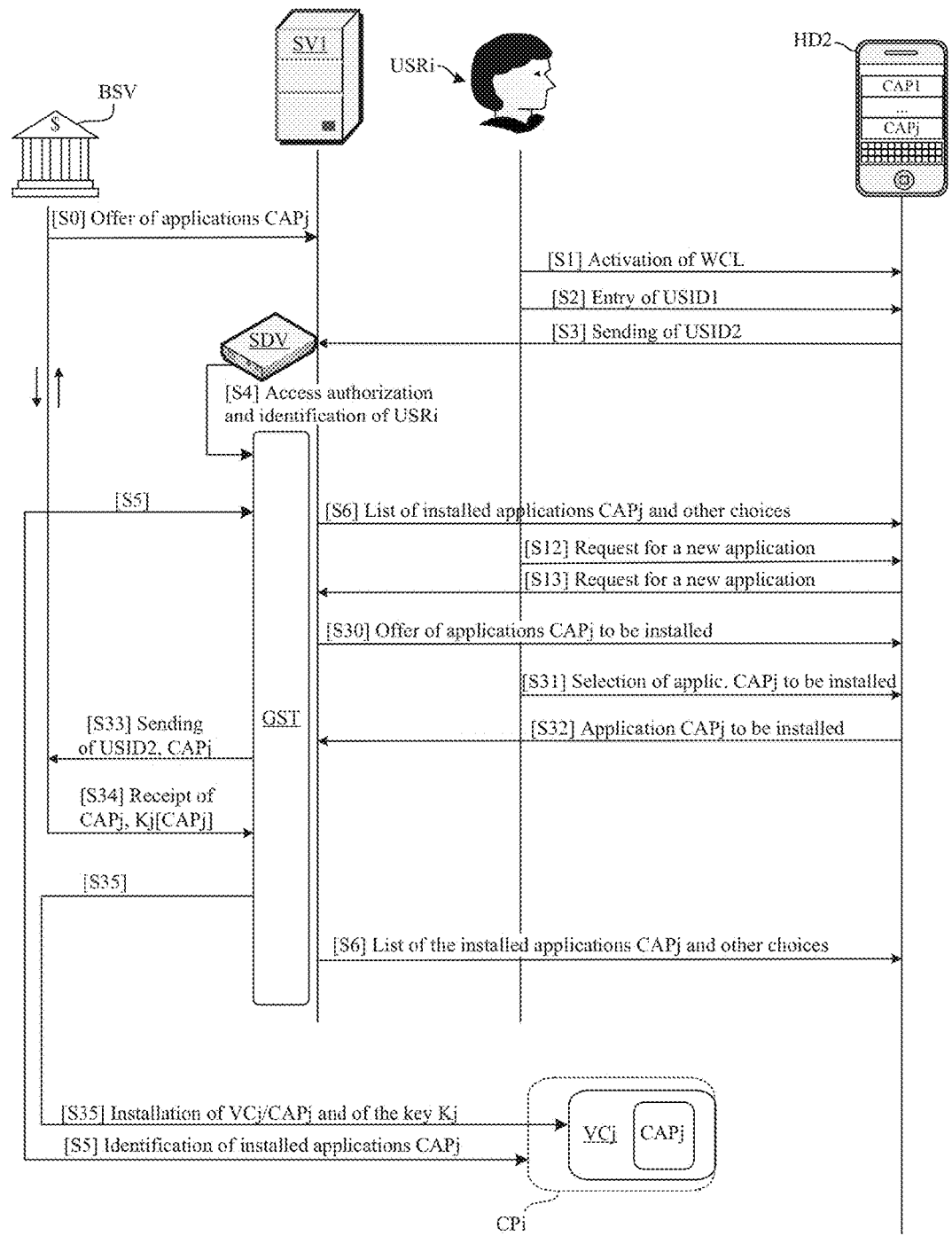
Figure 9:
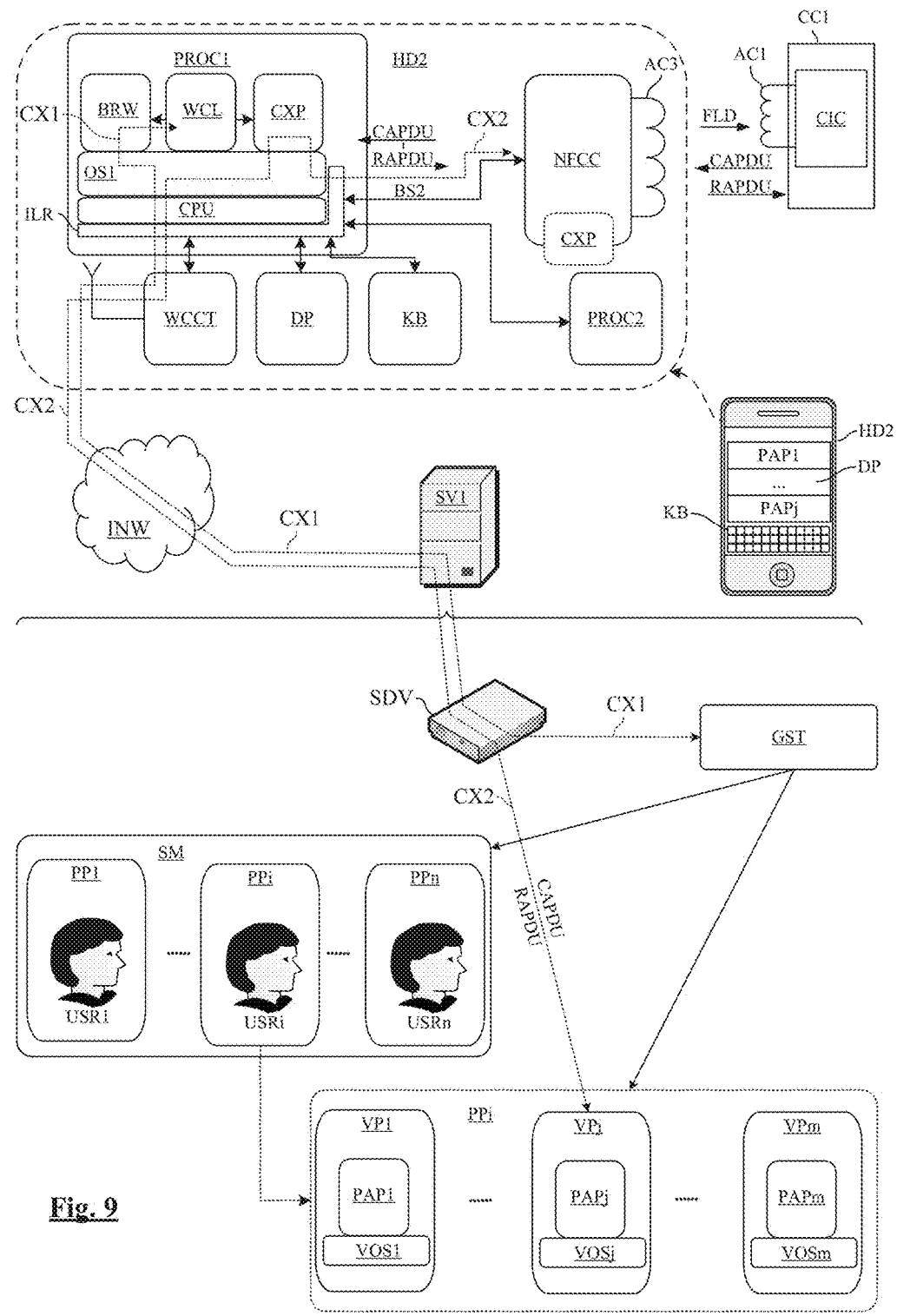
Figure 10:
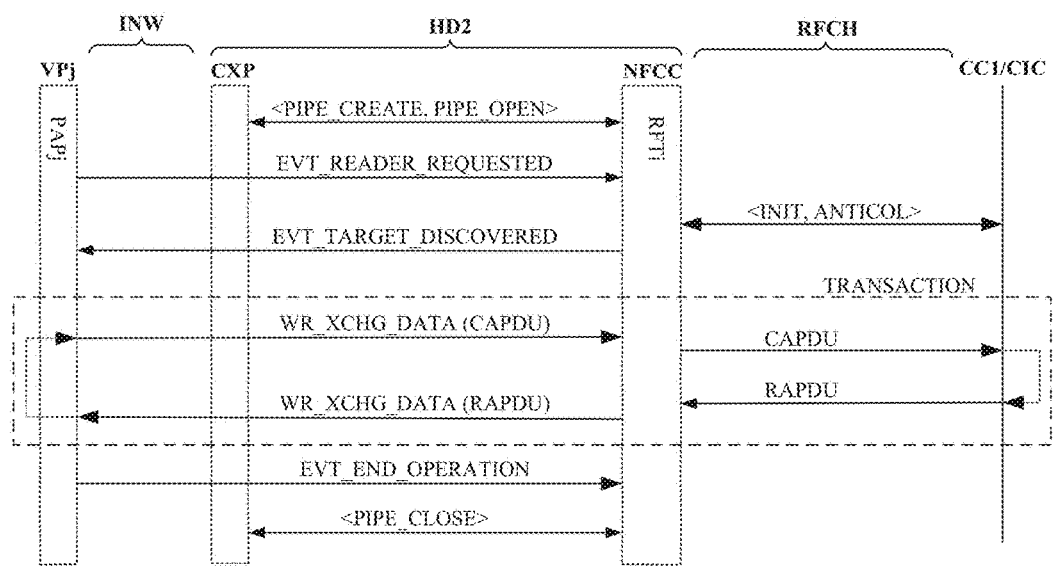
Figure 11:
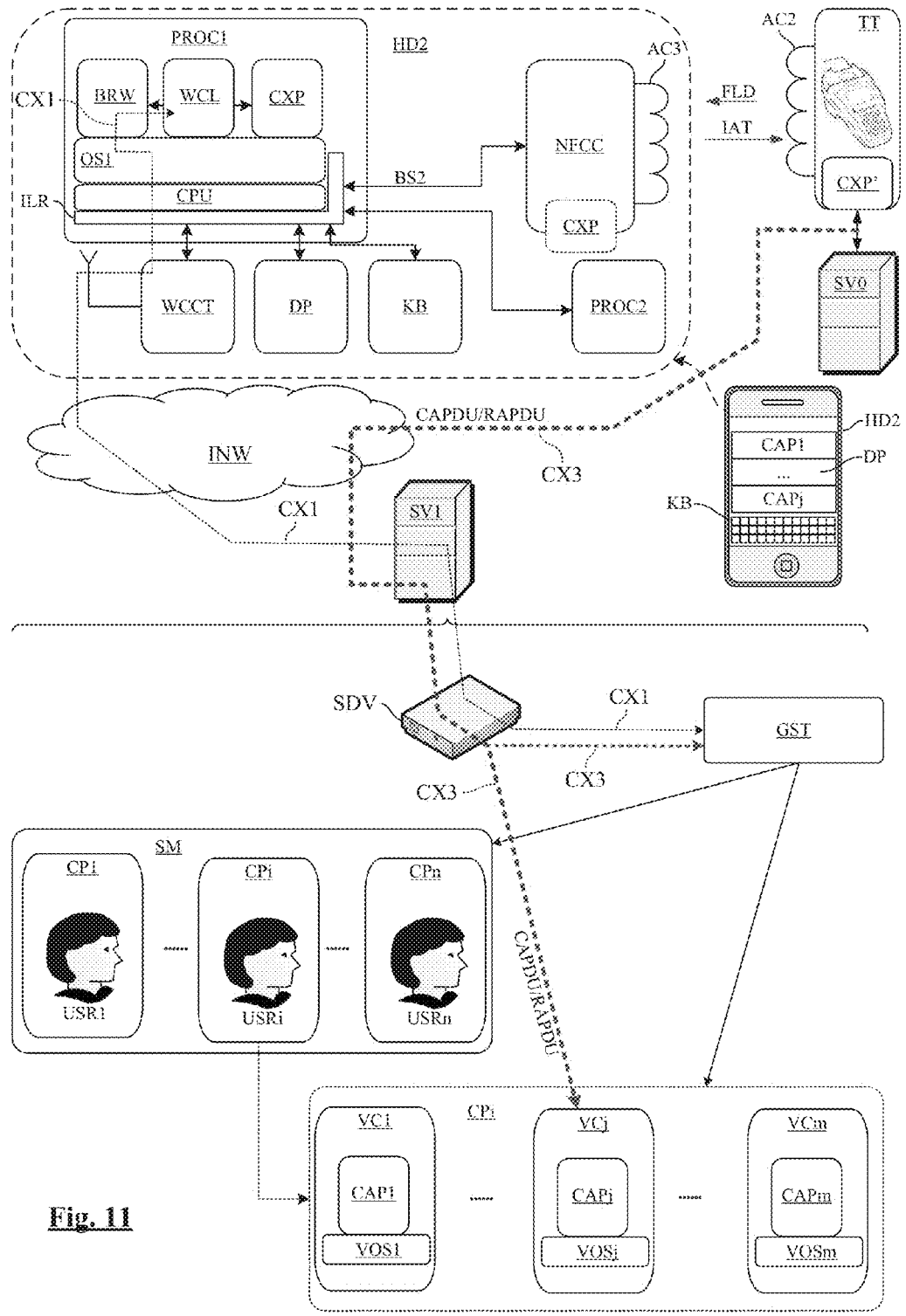
Figure 12:
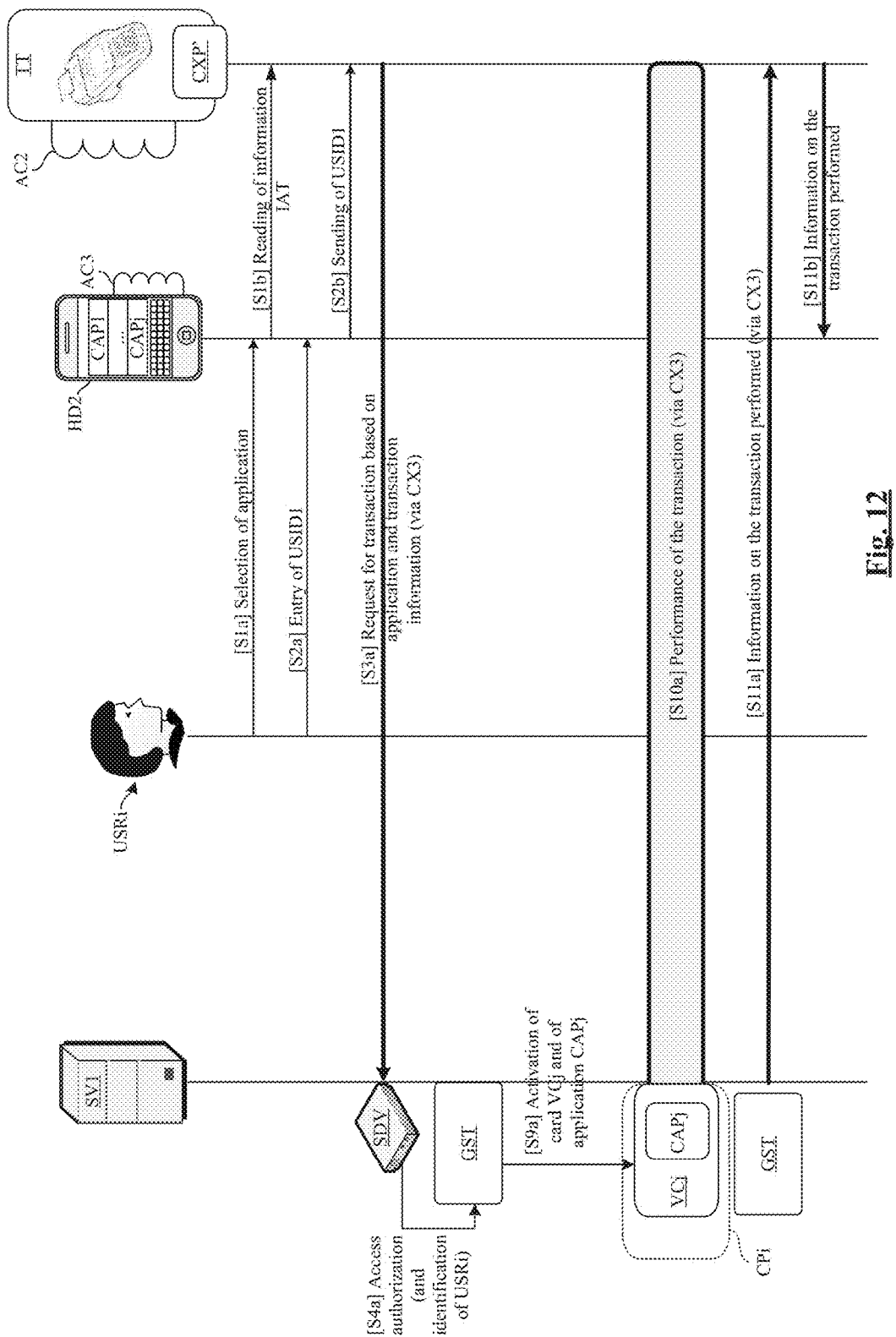

FIG. 1 described above represents a classic NFC transaction system including a contactless smart card;

FIG. 2 described above represents a classic NFC transaction system including a portable device equipped with a secure transaction processor;

FIG. 3 described above is a functional diagram of the transaction system in FIG. 2;

FIG. 4 represents one embodiment of an NFC transaction system;

FIG. 5 shows steps of an NFC transaction performed by way of the system in FIG. 4;

FIG. 6 shows in greater detail some steps of the transaction;

FIG. 7 shows one embodiment of a method for declaring a user to the transaction system in FIG. 4;

FIG. 8 shows one embodiment of a method for activating an application before its implementation in the transaction system represented in FIG. 4;

FIG. 9 represents another embodiment of an NFC transaction system;

FIG. 10 shows steps of an NFC transaction performed by means of the system in FIG. 9;

FIG. 11 represents one embodiment of an NFC transaction system according to the present invention; and FIG. 12 shows steps of one embodiment of an NFC transaction method according to the present invention performed by way of the system in FIG. 11.

DETAILED DESCRIPTION OF THE INVENTION

FIG. 4 represents one embodiment of a transaction system. The system includes a transaction terminal TT, a portable device HD2 and a transaction server SV1 connected to the Internet.

The terminal TT, equipped with an antenna coil AC2, is configured to perform an NFC transaction with an NFC contactless card such as the one represented in FIG. 1 or a device HD1 such as the one represented in FIG. 2.

The device HD2 includes a main processor PROC1, a display DP, a keyboard KB (which may be virtual and shown by the display), an NFC controller "NFCC" equipped with an antenna coil AC3 to establish a near field communication with the terminal TT, and a wireless communication circuit WCCT to enable the device HD2 to connect to the Internet INW.

The device HD2 may be a telephone, a PDA (Personal Digital Assistant), an MP3 player, or any other portable device equipped with resources for connecting to the Internet. If it forms a telephone, the device HD2 also includes a SIM card secure processor PROC2 authorizing the subscriber to use the GSM telephone network. The circuit WCCT may be a radiotelephone circuit enabling a connection to the Internet via the GSM network, for example a Long Term Evolution (LTE) connection or a GSM 4G connection, a WiFi card, or any other wireless resources for connecting to the Internet.

The processor PROC1 may be the main processor of the device HD2, for example a baseband processor if the device HD2 is a mobile telephone, or an auxiliary processor. The processor PROC1 includes a central processing unit CPU, a communication interface ILR, and an operating system OS1.

The communication interface circuit ILR, schematically represented in block form, includes all the connection ports of the processor and the software layers for managing the corresponding communication protocols.

The processor PROC1 is linked to the controller NFCC, the processor PROC2, the circuit WCCT, the keyboard KB and the display DP through the interface circuit ILR. More particularly, the processor PROC1 is linked to the controller NFCC through a bus BS2 and a corresponding port of the interface circuit ILR. The bus BS2 is for example an I2C (Inter Integrated Circuit) or SPI (Serial Peripheral Interface) data bus.

The server SV1 is configured to offer transaction services to users USRi (USR1, . . . USRn). It includes a security device SDV, a transaction service management program GST, and a memory area SM dedicated to the storage of transaction data and programs. The memory area SM is divided into sectors, each including a portfolio of cards CPi (CP1, . . . CPn). Each sector forming a portfolio of cards CPi is allocated to a user USRi and includes sub-sectors receiving virtual cards VCj (VC1, . . . VCm). Each user USRi subscribing to the transaction services offered by the server SV1 has one or more virtual cards VCj in the portfolio of cards CPi which is allocated to him/her. Each virtual card VCj is configured to perform at least one transaction corresponding to a service, and thus emulate a payment card of a determined type, for example a payment card for the metro, the bus, the supermarket, or more generally a bank card for withdrawing money or making payments. A virtual card VCj thus forms the equivalent of a physical card, in combination with the portable device HD2. A portfolio of cards CPi thus forms the equivalent of a physical wallet in which the user would place one or more physical cards.

Each virtual card VCj (VC1, . . . VCm) includes a virtual operating system VOSj (VOS1, . . . VOSm) and at least one card application CAPj (CAP1, . . . CAPm). From the perspective of the transaction protocol, each virtual card VCj is the functional equivalent of a classic secure processor PROC3 of the type described above in relation with FIG. 2, produced in previous practices in the form of a semiconductor chip.

According to one embodiment, the virtual operating system VOSj is a program which emulates an operating system OS of a classic secure processor PROC3, whereas the card application CAPj is a classic transaction program executable both by a classic secure processor PROC3 and by a virtual operating system VOSj.

According to an equivalent embodiment, the virtual operating system VOSj does not emulate an operating system OS of a classic secure processor. The card application CAPj is not executable by a classic secure processor and is only executable by the virtual operating system VOSj. The virtual operating system VOSj and the card application CAPj are specific programs configured to operate in combination and together form the equivalent of a classic secure processor PROC3 equipped with a card application as far as performing a transaction is concerned.

According to another equivalent embodiment, the virtual operating system VOSj is included in the card application CAPj, the two programs forming one.

According to one embodiment in which priority is given to optimizing the server memory space, the virtual operating systems VOSj and the card applications CAPj of the various virtual cards VCj are emulated by one or more centralized programs executed by the server SV1 in multitask mode. For example, a first central program emulates several operating systems at the same time and a second central program emulates the same card application for several virtual cards at the same time.

According to a preferred embodiment in which priority is given to security against fraud, the memory area SM contains as many virtual operating systems VOSj and card applications CAPj as virtual cards VCj. In other words, the sectors of the memory area SM containing the portfolios, and also the sub-sectors containing the virtual cards are entirely partitioned relative to one another and include no shared program operating in multitask mode.

According to one embodiment, each card application CAPj uses an encryption key Kj(CAPj) which enables it to respond to authentication requests requiring a cryptographic calculation. In the embodiment focusing on security and the partitioning of the sectors and sub-sectors of the memory area SM, the key Kj is stored in the sub-sector of the memory area SM receiving the memory card VCj which executes this application, i.e. receiving the virtual operating system VOSj and the card application CAPj together forming the virtual card.

The security device SDV protects the server and in particular access to the memory area SM and to the transaction service management program GST. The device SDV may be purely software and executed by the server SV1, or include a hardware part different from the hardware part of the server and a software part executed by the server or the different hardware part. It preferably includes a firewall function and a function to detect a fraudulent attempt to access a card application.

The transaction service management program GST, referred to below as "service manager", ensures the creation, activation, update and removal of virtual cards VCj, with the help of the security device SDV which grants it or denies authorizations for this purpose.

The server SV1 uses the device HD2 as a remote NFC interface enabling a virtual card VCi to perform a transaction with the terminal TT. For this purpose, the processor PROC1 includes, in a program memory, an Internet browser BRW, a Web client program WCL and a connection program CXP. The web client WCL is configured to establish a data link CX1 with the server SV1 through the browser BRW, the communication circuit WCCT (connection by LTE telephony for example, or WiFi connection) and the Internet INW. Once connected to the server, the web client WCL dialogs with the security device SDV or with the service manager GST, and shows the user web pages, information or information requests sent by them.

The data link CX1 enables the web client WCL to dialog with the security device SDV and the service manager GST, and is represented in dotted lines in FIG. 4. The data link CX1 is preferably a secure connection using for example the classic Secure Sockets Layers (SSL) technology based on a public key encryption method establishing a ciphered communication channel after an authentication step.

The connection program CXP is configured to establish a second data link CX2 between the controller NFCC and a virtual card VCj, through the bus BS2, the communication circuit WCCT and the Internet INW. According to one embodiment, the data link CX2 is established after receiving a connection request sent by the web client WCL or the browser BRW. According to another embodiment, the data link CX2 is established in a permanent manner between the controller NFCC and the security device SDV. The device SDV renders the data link CX2 accessible to a virtual card VCj at the same time as the virtual card must perform a transaction.

Like the data link CX1, the data link CX2 is preferably secure. The data link CX2 is for example formed via http communication channels (HyperText Transfer Protocol) or via a low-level User Datagram Protocol (UDP) link so as to limit the data exchange load. The data link CX2 can also be encrypted with the SSL technology or by means of a proprietary code.

According to another alternative, the controller NFCC is equipped with resources for connecting to the Internet and a proprietary encryption system is provided in its program memory. This method makes it possible to produce a point-to-point ciphered tunnel between the server SV1 and the controller NFCC and offers a very high level of security which cannot be attacked by spy software inserted into the program memory of the processor PROC1. In such an embodiment, the connection program CXP can be arranged in the program memory of the controller NFCC, as schematically represented by dotted lines in FIG. 4. In this case, the bus BS2 is used to enable the web client WCL to send the controller NFCC a request to connect to the server SV1 at the start of a transaction step S10 described below. An additional data bus may be provided to directly link the controller NFCC to the wireless communication circuit WCCT, without going through the processor PROC1.

In yet another alternative, a coprocessor dedicated to establishing and encrypting the communication is provided. This coprocessor is linked to the controller NFCC and to the wireless communication circuit WCCT and enables a card application CAPj to take control of the controller NFCC without depending on the software of the processor PROC1 and on any spy program that it may include.

In another alternative, the portable device HD2 only includes a single processor both controlling the units of the device HD2 and controlling NFC transactions in relation with the transaction server SV1.

In summary, according to the chosen embodiment, the connection program CXP may be included in the web client WCL, in the operating system OS1 of the processor PROC1, in a program memory or in the operating system of the controller NFCC, or be executed by a dedicated coprocessor, or be executed by a single processor replacing the processor PROC1 and the controller NFCC.

FIG. 5 represents steps of one embodiment of a transaction method implemented by way of the transaction system in FIG. 4.

It is assumed here that a user USRi is near the terminal TT and wishes to use the portable device HD2 to perform a transaction. The user first of all activates the web client WCL (step S1), for example by pressing a key on the keyboard or selecting a menu shown on the display. The web client WCL then asks the user to supply identification data USID1.

After entering the data USID1 (step S2), the web client WCL is linked to the security device SDV via the data link CX1 and supplies identification data USID2 thereto (step S3). The data USID2 includes all or part of the identification data USID1 and may include additional identification data such as data specific to the device HD2 that the web client takes from a memory of the device HD2.

The identification data USID1 may be varied and aim to guarantee a high level of security. They may include a login (user name or email) that the user must supply as well as a password. A security code sent by a bank to the user, for example by way of an SMS-type message, may also be included in the data USID1. Biometric data (voice, face, fingerprints, or the like) and/or dynamic data specific to the user, for example user code input data (input contact force on the keyboard, key contact time, or the like) can also be used as identification data USID1. Such biometric or dynamic data makes it possible, in addition to checking the user code, to check that this code has been input by the right person.

The data USID2 may include all or part of the data USID1 and the additional data the user has supplied only once for the creation of his/her portfolio of cards CPi. This may be identity data such as the user's date of birth, identity card number, passport number, home address, or the like. The data USID2 may also include data specific to the device HD2, such as the user's telephone number, an identification number of the device, for example, if it is a telephone, the IMEI number (International Mobile Equipment Identity) and/or the SIM card number.

The security device SDV then uses the data USID2 to check the legitimacy of the connection request. If the check result is positive, the device SDV gives the service manager GST the user identity USRi and a service access authorization (step S4). It also opens the data link CX1 to the service manager GST, if this has not been done previously.

The service manager GST then accesses the user portfolio CPi and determines whether virtual cards VCj and corresponding card applications CAPj have been installed therein (step S5).

If this is the case, the manager GST presents to the user, via the web client, a list of services corresponding to the card applications CAPj installed (step S6) and asks him/her to select the service he/she wishes to use to perform a transaction. The services are for example "access to the metro X", "payment checkout at supermarket Y", "bank card Z", or the like. This home page also offers the user other choices, in particular the installation of a new virtual card and a corresponding card application, the implementation of this option being described below.

The user selects the desired service (step S7) and his/her choice ("card application CAPj selected") is sent to the manager GST by the web client (step S8).

In one alternative of steps S7, S8, the user only confirms his/her wish to perform a transaction without specifying the desired service. In this case, the appropriate card application CAPj is automatically selected at the time of the transaction.

The web client WCL then asks the connection program CXP to establish the data link CX2 between the server SV1 and the controller NFCC, while the service manager GST selects and activates the virtual card VCj of the user and the card application CAPj that the user has designated (step S9). For his/her part, the user moves the device HD2 close to the transaction terminal TT so that an inductive coupling is established between the antenna coils AC2 and AC3. In one alternative embodiment, the data link CX2 is previously established between the security device SDV and the controller NFCC, and is simply rendered accessible to the card application CAPj by the device SDV after step S9.

The virtual card VCj is then linked to the controller NFCC. A connection is established with the transaction terminal TT and the card application CAPj of the virtual card VCj executes the transaction requested (step S10). This transaction may include actions by the user, such as accepting an amount or choosing a product. Although it is not represented in FIG. 5, the transaction terminal TT can also be linked to a bank server SV0 (see e.g., FIG. 4) which requires authentication steps and checks that responses to authentication requests have really been sent by a card application using an authorized bank key.

When the transaction is complete, the data link CX2 is closed, the virtual card VCj is deactivated and the manager GST sends the web client WCL information about the transaction performed, for example the object and the amount of the transaction (step S11). The web client can store and present this information to the user.

Those skilled in the art will note that the transaction method and system that have just been described are susceptible of various alternative embodiments. In particular, the web client WCL is a "header" program which uses web pages or data supplied by the server SV1 to form a user interface. Such a program may not be necessary. In this case, the user directly dialogs with the security device SDV and the service manager GST through web pages that the two units show him/her through the browser BRW.

FIG. 6 shows an example of a transaction performed in step S10. The transaction includes the following steps:

i) A pipe P1 is created between the virtual card VCj and an RFTi technology executed by the controller NFCC, by way of commands "PIPE_CREATE", "PIPE_OPEN". This step can be performed by the connection program CXP, as represented. Alternatively, this step can be performed by the virtual card VCj itself, if the latter includes an interface management program HCI, or by the security device SDV. It will be noted that the pipe P1, here compliant with the protocol HCP, is established through the data link CX2 which passes through the Internet and the bus BS2;

ii) The controller NFCC detects the magnetic field emitted by the terminal TT and sends the command EVT_FIELD_ON to the virtual card VCj;

iii) The controller NFCC performs steps of initializing a communication with the terminal TT including creating an NFC communication channel (referred to as "RFCH" in FIG. 6, or RF channel) as well as possible anti-collision steps if other NFC devices or contactless cards are located in the polling range of the terminal TT (step "INIT, ANTI-COL");

iv) When the connection with the terminal TT is established, the controller NFCC sends a command EVT_CARD_ACTIVATED to the virtual card VCj to indicate to it that a transaction can begin.

The actual transaction then includes the following steps:
the terminal TT sending commands CAPDU to the processor NFCC, via the RF communication channel;
the controller NFCC forwarding these commands to the card application CAPj of the virtual card VCj, through the pipe P1, in a form encapsulated in commands EVT_SEND_DATA;
the card application CAPj of the virtual card VCj sending the controller NFCC responses RAPDU, via the pipe P1, in a form encapsulated in commands EVT_SEND_DATA; and
the controller NFCC sending the responses RAPDU to the terminal TT, via the RF channel.

The commands CAPDU and the responses RAPDU (usually referred to as "C-APDU" and "R-APDU") are defined by the ISO 7816-4 standard. In one alternative embodiment of the transaction, the commands CAPDU and the responses RAPDU are encapsulated by way of the http protocol instead of using encapsulation commands EVT_SEND_DATA.

The first command CAPDU sent by the terminal TT may be a command for selecting the card application CAPj, for example the command "SELECT_AID" as defined by the ISO 7816-4 standard. If the card application has previously been selected by the user in step S7 and if this application does not correspond to the one requested by the transaction terminal TT, the virtual card VCj sends back an error message and the transaction is interrupted.

In the alternative embodiment of step S7 described above, where the user only confirms his/her wish to perform a transaction without selecting a determined virtual card, the virtual card containing the appropriate card application is automatically selected by a card selection program included in the user's portfolio of cards. At the beginning of step S10, this high level program performs the initial activation of the card application gate CAG and the creation of the pipe P1 so as to receive the command for selecting the card application. It then activates the card application designated by the command, if the latter is installed in the portfolio of cards. If this is not the case, the transaction is interrupted.

When the transaction is over (or interrupted), the terminal TT stops emitting the magnetic field and the controller NFCC sends the virtual card VCj a command EVT_CARD_DEACTIVATED for deactivating the card application and a command EVT_FIELD_OFF indicating that the magnetic field is no longer present. The pipe P1 is then closed between the virtual card VCj and the controller NFCC, by way of a command "PIPE_CLOSE". This step of closing the pipe P1 can be performed by the virtual card VCj itself or by the connection program CXP, as represented. Alternatively, this step can be performed by the security device SDV. The service manager GST then executes the step S11 described above (FIG. 7).

Those skilled in the art will note that this example of transaction through an interface HCI is in no way limitative. The connection between the virtual card VCj and the controller NFCC can be established by way of various other protocols and other commands can be provided.

In the example of transaction that has just been described it is assumed, on the one hand, that the user USRi has a portfolio of cards CPi and, on the other hand, that the portfolio contains at least the virtual card VCj necessary for this transaction.

FIG. 7 represents one embodiment of a method for creating a portfolio of cards CPi. It is assumed that the user USRi first connects to the service manager GST as a non-registered user, via an Internet connection. The manager GST then supplies the device HD2 with a home page for non-registered users, in which the user is offered the possibility of subscribing to the transaction services (step S20). The user's acceptance of the offer here triggers the download and installation of the web client WCL in the device HD2 (step S21). The web client WCL connects to the manager GST (step S22) by way of the data link CX1 and the manager GST sends the user a registration page (step S23) in which various information is requested, to form the identification data USID1. In addition to such data, the user may be asked to provide his/her bank details and any additional data enabling the data USID2 to be defined. The web client may also take from the device HD2 data specific to the latter, intended to form data USID2.

When the web client WCL has all the data USID1 and USID2 (step S24) and any other information necessary for the user to subscribe, it supplies the data USID2 to the security device SDV (step S25). The security device SDV then checks the identification data USID2, determines whether the user USRi can be authorized to have a portfolio of cards, then sends an authorization for creating the portfolio to the service manager GST (step S26).

The manager GST then creates the portfolio CPi (step S27). In practice, this creation may merely consist in registering the user in a database containing the identification data USID2 and a look-up table designating the sector of the memory area SM allocated to the user.

The manager GST then sends the device HD2 a confirmation of creation of the portfolio CPi (step S30).

FIG. 8 represents one embodiment of a method for acquiring a virtual card VCj. This method can be initiated after step S28 described above or, as represented in FIG. 8, after another connection to the server SV1. This new connection includes the steps described above, i.e.:
  activating the web client (step S1),
  entering the data USID1 (step S2),
  the web client sending the data USID2 to the security device SDV (step S3), to check the legitimacy of the connection request,
  the security device checking the legitimacy of the connection request and communicating an access authorization to the manager GST (step S4),
  the manager GST accessing the portfolio CPi and determining the card applications CAPj which have been installed therein (step S5),
  sending the user a list of the card applications CAPj installed, as well as a suggestion to install a new card application (step S6).

It is assumed here that the user selects the option "install a new application" (step S12) instead of selecting an application (step S7, FIG. 5), either because he/she does not have any application installed or because he/she wishes to install a new one.

The web client sends the new application request to the service manager GST (step S13). The following steps involve one or more bank servers, or certification servers, or preferably a single certification server BSV grouping together the services of one or more banks. Before processing the request for installation of a new application, the service manager GST may have previously received from the certification server BSV an offer of applications CAPj (step S0).

The service manager GST thus sends the device HD2 a page offering card applications CAPj presented in the form of an offer of transaction services (step S30).

The user then selects a transaction service, which corresponds to the selection of a card application CAPj (step S31). His/her choice is passed on to the manager GST by the web client (step S32).

The manager GST then sends the server BSV the user identification data USID2 as well as an identifier of the card application CAPj requested (step S33), and requires an authorization for creating the corresponding virtual card. This step may include multiple accesses to the bank server. It may possibly be delayed if the certification server indicates that the user must previously be contacted by sales people to perform certain procedures. Conversely, the user may have already performed the procedures and supplied in the data USID1 a code received from the bank, which authorizes him/her to obtain the card.

After checking, the server BSV sends back to the manager GST the program of the card application and an activation bank key Kj(CAPj) enabling the card application to be used (step S34). This key forms an encryption key enabling the application to be authenticated by a transaction terminal, when it is asked to do so. The manager GST then creates the virtual card VCj in the portfolio CPi, including, where applicable, installing the virtual operating system VOSj of the card, and then installs the application CAPj in the virtual card VCj, and installs the key Kj (step S35).

In one alternative, various card applications CAPj are stored in a space for storing applications of the manager GST and the certification server supplies only the activation key Kj.

The manager GST then returns to step S6 to present to the user a list of the card applications CAPj installed, as well as a suggestion to install a new card application. The user may decide to install another new application, to use the one that has just been installed or an application previously installed, or to disconnect from the server SV1.

In one alternative, the manager GST does not have any right to modify virtual cards VCj and steps S33, S34 and S35 are assigned to the security device SDV.

The example of a transaction system that has just been described is susceptible of various other embodiments. In particular, some embodiments of the transaction system may relate to the virtualization of a payment point implementing a payment point application instead of a card application. A payment point application PAPj differs from a card application CAPj in that it aims to collect an amount of money through a transaction with a smart card enabling the payer to be identified.

FIG. 9 represents a transaction system which, compared to the one in FIG. 4, has the following differences:

the device HD2, instead of being arranged opposite a transaction terminal TT, is arranged opposite a contactless card CC1 including an antenna coil AC1 and a contactless integrated circuit CIC, and performs a transaction with the latter;

the server SV1, instead of managing card applications CAPj arranged in virtual cards VCj, which are themselves arranged in portfolios of cards CPi, manages payment point applications PAPj (PAP1, . . . PAPm) arranged in virtual payment points VPj (VP1, . . . VPm), which are themselves arranged in portfolios of payment points PPi (PP1, . . . PPn) allocated to users USRi. Each virtual payment point may include, in addition to a payment point application PAPj, a program VOSj (VOS1, . . . VOSm) for emulating an operating system of a payment terminal, which may also be included in the payment point application PAPj.

By analogy with the classic transaction system represented in FIG. 1, the device HD2 acts here as a transaction terminal TT. The controller NFCC emits the magnetic field FLD required to establish a contactless communication channel with the card CC1. The payment point application program PAPj takes control of the controller NFCC to perform the transaction. It sends commands CAPDU and receives responses RAPDU. The payment point application program PAPj can be configured to connect, during or after the transaction, to a bank authorization server such as the server SV0 shown in FIG. 1.

The method represented in FIG. 5 may be adapted to perform a transaction in payment point mode, by activating in step S10 a payment point application PAPj instead of a card application CAPj, and by searching in step S5 for the virtual payment points VPj installed in the portfolio PPi of a user USRi. In step S6, the method may include the presentation of a list of available payment point applications PAPj instead of the presentation of a list of card applications CAPj, or a presentation of both types of transaction services. Finally, the method represented in FIG. 7 may be adapted to the creation of a portfolio of payment points PPi instead of a portfolio of cards CPi. Similarly, the method represented in FIG. 8 may be modified so that steps S31 to S35 relate to the installation of a payment point application and a virtual payment point.

FIG. 10 shows an example of a transaction performed between a virtual payment point VPj and the contactless card CC1, which occurs for example in step S10 of the method in FIG. 5 adapted to perform a transaction in payment point mode. The transaction includes the following steps:

i) A pipe P2 is created between the virtual payment point VPj and an RFTi technology executed by the controller NFCC, by way of commands "PIPE_CREATE", "PIPE_OPEN". This step can be performed by the connection program CXP, as represented. Alternatively, this step can be performed by the virtual payment point VPj itself, if the latter includes a program for managing the interface HCI, or by the security device SDV, before the latter renders the data link CX2 accessible to the virtual payment point VPj;

ii) Sending the controller NFCC polling commands EVT_READER_REQUESTED aiming to detect the presence of the contactless integrated circuit CIC (polling method). This step may be performed by the virtual payment point VPj, as represented. Alternatively, this step can be performed by the connection program CXP, or by the security device SDV, before it renders the data link CX2 accessible to the virtual payment point VPj;

iii) When the contactless integrated circuit CIC of the card CC1 is detected, the controller NFCC performs steps "INIT, ANTICOL" for initializing a communication with the contactless integrated circuit CIC with creation of an RF communication channel (referred to as RFCH in FIG. 10), and optionally anti-collision steps (if other contactless integrated circuits are present in the range), The controller NFCC sends the command EVT_TARGET_DISCOVERED to the virtual payment point VPj to indicate to it that a transaction can begin.

The actual transaction then includes the following steps:

The virtual payment point application PAPj sending the controller NFCC commands CAPDU, via the pipe P2, the commands CAPDU being encapsulated in commands WR_XCHG_DATA, The controller NFCC forwarding the commands CAPDU to the contactless integrated circuit CIC, through the RF channel, The contactless integrated circuit CIC sending the controller NFCC responses RAPDU, The controller NFCC forwarding the responses RAPDU to the virtual payment point application PAPj, via the pipe P2, the responses RAPDU being encapsulated in commands WR_XCHG_DATA.

The transaction is closed when the command EVT_END_OPERATION is sent to the controller NFCC. This step may be performed by the virtual payment point VPj, as represented. Alternatively, this step can be performed by the connection program CXP, or by the security device SDV, before it renders the data link CX2 accessible to the virtual payment point VPj;

The pipe P2 is then closed by way of a command "PIPE_CLOSE". This step can be performed by the connection program CXP, as represented. Alternatively, this step can be performed by the virtual payment point VPj itself, if the latter includes a program for managing the interface HCI, or by the security device SDV.

The transaction system represented in FIG. 9 is itself susceptible of various alternatives. For example, the contactless card CC1 can be replaced with another portable device HD2' which operates in the card emulation mode, as previously described in relation with FIGS. 5 and 6. If the same server SV1 manages both card applications and payment point applications, the two portable devices HD2, HD2' facing each other may execute a transaction, one as a card, or payer, and the other as a payment point, or receiver, while being simultaneously connected to the same server SV1. A transaction system as described above can therefore enable private transactions to be performed, for example a transfer of money from one person to another by means of their mobile telephones.

FIG. 11 represents one embodiment of a transaction system according to the present invention, which is derived from that in FIG. 4. Various features of the system have been described above in relation with FIG. 4 and will not be described again. The system differs from the one in FIG. 4 in that the terminal TT is linked to the server SV1 by IT resources and includes a connection program CXP' configured to establish a data link CX3 between the terminal TT and the server SV1. These communication links can be made using the Internet INW or a private network directly linking the terminal TT to the server SV1.

The data link CX3 enables the transaction to be performed by the server SV1 with the terminal TT on behalf of the portable device HD2 (i.e. on behalf of the user of the device HD2) without going through the device HD2.

This embodiment is an alternative to the embodiment described above, which was based on the establishment of the data link CX2. It can also be applied when the data link CX2 has a data rate that is too low to ensure that the transaction will be performed within a limited time acceptable for the user, or when the data link CX2 cannot be established (total absence of connection by LTE telephony or Wifi connection for example).

A transaction performed through the data link CX3 will be referred to below as a "transaction in off-line mode".

In the terminal TT, the connection program CXP' is configured to establish the data link CX3 once the device HD2 has supplied application and transaction information IAT enabling the terminal TT to ask the server SV1 to select and activate a virtual card VCj and an application CAPj with which it will then perform a transaction. Like the data link CX2, the data link CX3 is preferably secure. The data link CX3 is for example formed via http communication channels or via a low-level UDP link. The data link CX3 can also be encrypted with the SSL technology or by way of a proprietary code. In yet another alternative, the terminal TT includes a proprietary ciphering system and makes a point-to-point ciphered tunnel with the server SV1.

FIG. 12 represents steps of a transaction method according to the present invention in the off-line mode, implemented by means of the transaction system in FIG. 11.

Step S1a—This step is optional and enables the user USRi to select an application the identity of which will be determined by the terminal TT during the next step S1b. It is assumed as above that a user USRi is near the terminal TT and wishes to use the portable device HD2 to perform a transaction. An NFC communication channel is established between the device HD2 and the terminal TT.

Step S1b—The terminal TT, through the RF channel, receives from the device HD2 the application and transaction information IAT, for example by reading it in a register or a memory of the device HD2. The application and transaction information IAT includes for example:

an identifier of the application selected by the user, if any, otherwise a list of application identifiers, an IP address of the transaction server SV1 (Internet address), secure data for identifying the device HD2 (also referred to as "credentials").

If the user USRi has selected an application in step S1a, the terminal TT only finds a single application identifier in the device HD2. If the user failed to do so, the terminal can find several application identifiers and selects by default the application for which it has been designed. For example, if the terminal TT is a fare management terminal (metro access terminal, bus line, etc.) and if it finds in the device HD2 a transport application identifier and a payment application identifier, it selects by default the transport application as it does not manage the payment application.

Steps S2a, S2b—The user provides the device HD2 with user identification data USID1, for example a personal identification number (PIN code), and the device HD2 communicates it to the terminal TT. These steps are optional and depend on the desired level of security, like classic transactions performed by means of smart cards which, in certain applications, do not require the user to provide an identifier. Furthermore, in step S2a, the user identification data USID1 can be directly provided by the user to the terminal TT, if the terminal has a keyboard.

Step S3a—Based on the IP address present in the application and transaction information IAT, and through the link CX3, the terminal TT is linked to the security device SDV of the server SV1. The terminal TT presents a service access authorization request to it and provides it with the other application and transaction information IAT, in particular the credentials of the device HD2 and the identifier of the intended application, and furthermore, and optionally, the user identification data USID1 of the user USRi.

Step S4a—The security device SDV uses this information to check the legitimacy of the service access authorization request and the identity of the user USRi.

Step S9a: If the result of the check is positive, the device SDV communicates the identity of the user USRi, a service access authorization, and the identifier of the intended application to the service manager GST. It also opens the data link CX3 to the service manager GST, if this has not been done previously.

The service manager GST then selects and activates the virtual card VCj of the user and the card application CAPj corresponding to the requested application. The virtual card VCj is then linked to the terminal TT.

Step S10a—The card application CAPj of the virtual card VCj executes the requested transaction, through the data link CX3. It will be noted that the identification of the terminal TT itself, as a terminal authorized to perform this transaction, may be done at this time by the card application itself. It will also be noted that the example of transaction described above in relation with FIG. 6 to illustrate step S10, also applies to step S10a, with the difference that the intermediate steps between the component NFCC and the connection program CXP are removed, the terminal TT directly sending application protocol data (commands CAPDU) to the virtual card VCj and the latter directly sending application protocol data (responses RAPDU) to the terminal TT, without going through the portable device HD2 and thus without encapsulating in the NFC communication protocol layer.

Furthermore, as indicated above, the transaction terminal TT can be linked to a bank server SV0 (see e.g., FIG. 11) which requires authentication steps and checks that responses to authentication requests have really been sent by a card application using an authorized bank key.

Step S11a (optional step)—The transaction is complete and the manager GST sends the terminal TT information about the transaction performed, for example the object and the amount of the transaction, then deactivates the virtual card VCj and closes the data link CX3.

Step S11b (optional step)—The terminal passes such information on to the device HD2 which can store and present it to the user.

It will be noted that one embodiment of this transaction method can involve the link CX1, in the event that the device HD2 can autonomously connect to the server SV1, including if the link CX1 has a low rate.

The link CX1 can enable the level of security of the transaction to be increased by enabling the server SV1 to ensure for example that the legitimate user is really present. Certain preparatory steps of the transaction can thus be performed via the link CX1 instead of the link CX3, for example providing the security device SDV of the server with the user identification data USID1 of the user USRi. In this case, the steps S2a, S2b are not performed.

The link CX1 can also be used to provide the server SV1 with the identifier of an application selected by the user. In this case, the application and transaction information IAT provided to the terminal TT by the device HD2 only includes the IP address of the transaction server SV1 and the credentials of the device HD2.

Furthermore, the address of the transaction server SV1 may not be included in the application and transaction information IAT. This address can be pre-saved in a memory of the terminal TT (fixed address of a unique server to which the terminal TT is attached), or chosen by the terminal TT in a list of addresses pre-saved in its memory, according to the identity of the portable device HD2 and/or the requested application. In this case, the application and transaction information IAT only includes the credentials of the device HD2, or only includes the credentials of the device HD2 and the identifier of the selected application.

Secondly, and again to increase the level of security, the link CX1 can also enable the user to specify to the server, in addition to specifying the selected application, how long he/she authorizes the activation of this application, in other words how long he/she authorizes the activation of the corresponding card application CAPj. For example, the user can authorize the activation of the application for two minutes. If the terminal does not perform the transaction within the next two minutes, the authorization is cancelled. This security measure avoids a fraudulent terminal subsequently attempting to perform a transaction with this card application.

Lastly, the communication channel between the portable device and the transaction terminal could be based on a technology other than the NFC technology that uses a magnetic field as communication medium. This may for example be a UHF electric field.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for performing a transaction with a mobile device and a transaction terminal, the method comprising:
providing a transaction server operatively linked with the transaction terminal via a data network, the transaction server including a virtual card corresponding with the mobile device, the virtual card including a program that may be executed to perform a transaction with the transaction terminal on behalf of the mobile device, the virtual card being configured to emulate a secure processor of the mobile device,
establishing a communication channel between the mobile device and the transaction terminal,
providing, by the mobile device, the transaction terminal with application and transaction information, the application and transaction information including credentials of the mobile device,
establishing, based on the application and transaction information, a data link between the transaction terminal and the transaction server, the data link bypassing the mobile device,
activating, based on the application and transaction information, the virtual card in the transaction server and linking it to the transaction terminal through the data link, and
executing the program of the virtual card in the transaction server to perform the transaction with the transaction terminal through the data link, the executing the program of the virtual card to perform the transaction including:
the virtual card of the transaction server receiving at least one application protocol data unit command from the transaction terminal, and
the virtual card of the transaction server sending the transaction terminal, on behalf of the mobile device, at least one application protocol data unit response.

2. The method according to claim 1, wherein information related to the virtual card in the transaction server is included in the application and transaction information provided by the mobile device, the transaction terminal providing the information related to the virtual card to the transaction server through the data link.

3. The method according to claim 1, wherein the data link is a first data link, the method further comprising:
establishing a second data link between the mobile device and the transaction server, the second data link bypassing the transaction terminal, and
providing the transaction server, through the second data link, with information related to the virtual card in the transaction server.

4. The method according to claim 3, further comprising providing the transaction server with information related to a time during which the virtual card in the transaction server can be activated.

5. The method according to claim 1, further comprising:
providing the transaction server with identification data of a user, and
configuring the transaction server so that it refuses to execute the transaction on behalf of the mobile device if the transaction server determines that the identification data is incorrect.

6. A transaction system comprising:
a mobile device,
a transaction terminal, and
a transaction server operatively linked with the transaction terminal via a data network,
the transaction server having a virtual card included therein, the virtual card including a program that may be executed to perform a transaction with the transaction terminal on behalf of the mobile device, the virtual card being configured to emulate a secure processor of the mobile device,
the mobile device being configured to establish a communication channel with the transaction terminal, and to provide the transaction terminal with application and transaction information, the application and transaction information including credentials of the mobile device,
the transaction terminal being configured to establish, based on the application and transaction information, a data link between the transaction terminal and the transaction server, the data link bypassing the mobile device,
the transaction server being configured to:
activate, based on the application and transaction information, the virtual card in the transaction server and link it to the transaction terminal through the data link, and
execute the program of the virtual card to perform the transaction with the transaction terminal through the data link,
the executing the program of the virtual card to perform the transaction including:

the virtual card of the transaction server receiving at least one application protocol data unit command from the transaction terminal, and the virtual card of the transaction server sending the transaction terminal, on behalf of the mobile device, at least one application protocol data unit response.

7. The transaction system according to claim 6, wherein the mobile device is further configured to include, in the application and transaction information, information related to the virtual card in the transaction server.

8. The transaction system according to claim 6, wherein the data link is a first data link, the mobile device being further configured to:

establish a second data link with the transaction server, the second data link bypassing the transaction terminal, and provide the transaction server, through the second data link, with information related to the virtual card in the transaction server.

9. The transaction system according to claim 7, wherein the mobile device is configured to provide the transaction server with information related to a time during which the virtual card in the transaction server can be activated.

10. The transaction system according to claim 6, wherein the mobile device is further configured to:

provide the transaction server with identification data of a user, and the transaction server is further configured to refuse to execute the transaction on behalf of the mobile device if the transaction server determines that the identification data is incorrect.

11. The transaction system according to claim 6, wherein the transaction terminal receives the application and transaction information by reading it from a register or a memory of the mobile device.

12. The method according to claim 1, wherein the virtual card of the transaction server includes a virtual operating system and at least one card application.

13. The method according to claim 12, wherein the virtual operating system emulates an operating system of a secure processor of the mobile device.

14. The transaction system according to claim 6, wherein the virtual card of the transaction server includes a virtual operating system and at least one card application.

15. The transaction system according to claim 14, wherein the virtual operating system is configured to execute the at least one card application.

16. The transaction system according to claim 6, wherein the virtual card is a first virtual card, the transaction server including an emulator configured to emulate the first virtual card and to emulate at least a second virtual card.

* * * * *